United States Patent [19]

Meyer et al.

[11] Patent Number: 5,684,955
[45] Date of Patent: Nov. 4, 1997

[54] PROCESS FOR DISTRIBUTING AN OBJECT-ORIENTED PROGRAM OVER A PLURALITY OF OPERATING SYSTEM PROCESSES OF A COMPUTER SYSTEM

[75] Inventors: Walter Meyer; Oliver Rothe, both of Munich; Franz Kneissl, Nürnberg; Hans-Jürgen Hubmann, Neunkirchen; Rüdiger Bess, Fürth, all of Germany

[73] Assignee: Siemens Aktiengesellschaft, Munich, Germany

[21] Appl. No.: 211,110
[22] PCT Filed: Jun. 30, 1992
[86] PCT No.: PCT/DE92/00538
§ 371 Date: May 26, 1994
§ 102(e) Date: May 26, 1994
[87] PCT Pub. No.: WO93/06548
PCT Pub. Date: Apr. 1, 1993

[30] Foreign Application Priority Data

Sep. 20, 1991 [DE] Germany .................. 41 31 380.1

[51] Int. Cl.[6] .................................................. G06F 9/44
[52] U.S. Cl. ................... 395/200.03; 395/683; 395/684; 364/280; 364/281.3; 364/282.1
[58] Field of Search ..................... 364/280, 280.4, 364/280.6, 281.3, 284, 284.3, 284.4, 286, 282.1; 395/650, 700, 280–281.3, 284–284.3, 200.03, 623, 684

[56] References Cited

U.S. PATENT DOCUMENTS

| | | |
|---|---|---|
| 4,553,205 | 11/1985 | Porchia ................................ 364/300 |
| 5,095,522 | 3/1992 | Fujita et al. .................. 395/DIG. 1 |
| 5,265,206 | 11/1993 | Shackelford et al. ......... 395/DIG. 1 |
| 5,305,461 | 4/1994 | Fergenbaum et al. ............... 395/755 |
| 5,341,478 | 8/1994 | Travis, Jr. et al. ..................... 395/200 |
| 5,347,633 | 9/1994 | Ashtreld et al. ............... 395/DIG. 1 |
| 5,440,744 | 8/1995 | Jacobson et al. ................... 395/650 |
| 5,475,819 | 12/1995 | Miller et al. .................. 395/200.03 |

OTHER PUBLICATIONS

Leblang, et al., "Computer–Aided Software Engineering In A Distributed Workstation Environment"; 1984.
"Teitelman, A Tour Through Cedar"; 1985.
Employees of WordPerfect Corp; *WordPerfect*; WordPerfect Corp.; 1989; pp. 592–600.
Tsubotani, et al.; "Construction of a Software Development Environment Based on A High–Level Language Architecture"; 1986; Systems and Computers in Japan; vol. 18, No. 6.
Aho, et al.; *The AWK Programming Language*; 1988; AT&T.
Reiss; "Graphical Program Development with Pecan Program Development Systems " 1984.
Reiss; "Pecan: Program Development Systems that Support Multiple Viens"; 1985.
"A General Model and Mechanisms for Model–Level Heterogeneous PRC Interoperability", by Alexander D. Stoyenko, Parallel and Distributed Data Processing 1990 Proceedings.
Birrell, Andrew D. & Nelson, Bruce J.: Implementing Remote Procedure Calls, Feb. 1984, pp. 39–59.
Black, Andrew Y. & Artsy, Yeshayahu: Implementing Location Independent Invocation, 1989, pp. 550–559.
Gammage, Neil & Casey, Liam: XMS: A Rendezvous-–Based Distribution System Software Architecture, May, 1985, pp. 9–19.

*Primary Examiner*—Kevin A. Kriess
*Assistant Examiner*—Majid A. Banankhah
*Attorney, Agent, or Firm*—Hill, Steadman & Simpson

[57] ABSTRACT

In an object-oriented application, a preparation process is used when compiling the sources of the application, a configuration process is used when link-editing, and a communication process is used during execution to call up methods for objects. No adaptation of sources is necessary when a system configuration is changed. This also applied to an extension of the object-oriented application.

4 Claims, 6 Drawing Sheets

< objectpointer >->< methodname >(< parameters >)

< objectpointer >: Reference to the object to which the message is sent
< methodname >: Designation of the message
< parameters >: Parameter part for the message

FIG. 7

((< objectpointer >-> Vstub()))?(SX_SEND ((_CSXobj*)
< objectpointer >,< methodID >,< parameterstring >,<parameters>)):
< objectpointer >-><methodname>(< parameters >))

< methodID >: Method identification for the system-wide unambiguous identification of methods of classes of the application
< parameterstring >: Character string for identifying parameters when packing and unpacking parameters

FIG. 8

(SX_SEND ((_CSXobj*)< objectpointer >,<methodID>
< parameterstring >,< parameters >)

FIG. 9

< objectpointer >-> Vstub ())

PROCESS FOR DISTRIBUTING AN OBJECT-ORIENTED PROGRAM OVER A PLURALITY OF OPERATING SYSTEM PROCESSES OF A COMPUTER SYSTEM

BACKGROUND OF THE INVENTION

1. Field of the Invention

The invention relates to a process for adapting an object-oriented application so that the latter can be distributed over a plurality of operating system processes.

2. Description of the Related Art

Object-oriented applications can be realized by means of object-oriented programming. An object-oriented system comprises not only functions or procedures which call each other up, for instance in the case of programming with the programming languages Fortran, Pascal and C, but objects are also provided which communicate with one another by exchanging messages. An example of an object-oriented programming language is the programming language C++ which was developed by extending the wide-spread programming language C. Classes of objects are declared by means of type definitions in the programming language C++. The objects are assumed to be variables of a class type and are referred to as instances of the class. Each object has instance variables as a set of data. It is only possible to access the instance variables by means of specific functions defined in the respective class definition. These access functions assigned to the class are termed methods of the class. In the programming language C++, the sending of a message to an object is equivalent to calling up a method for this object. The programming language C++ supports the inheritance of classes. The instance variables and the methods of a class can be assumed by a derived class by means of inheritance. Methods of the base class can be declared with the keyword virtual so that these methods can be redefined in a derived class. Objects can be referenced by pointers, and can also be generated dynamically, so that it is only possible to decide at runtime which implementation of a method will actually be executed. In the programming language C++ applications are limited to exactly one process within the meaning of the operating system. In a real application problems can arise if the application exceeds a certain size since operating system processes can only have a limited size. The size of a C++ application is therefore also limited without additional measures. Some application areas, in particular automation engineering and telecommunications, have requirements which necessitate the application being distributed over a plurality of independent, separately executable and loadable operating system processes. Such a distribution over a plurality of operating system processes, that is to say no lightweight processes, cannot be formulated with the language facilities of C++ alone. Such a distribution of an application over a plurality of operating system processes requires a considerable extension of the functionality, in that mechanisms of the operating system which establish the communication between the operating system processes are to be used. It is conceivable for the programmer explicitly to insert calls in the application for inter-process communication (IPC), and also for separate IPC classes to be used. In this case, the software producer must program the IPC mechanisms himself. The distribution of the application over the individual operating system processes is permanently encoded in the source program. If it becomes necessary to change the process distribution, the programmer must modify the source programs and compile them again.

A communication process is known from the publication "Implementing Remote procedure Calls" by A.D. Birrel et al in the "ACM Transactions on Computer Systems, Vol. 2, February 1984, New York, USA, pages 39–59", which process enables programs written in a high-level language to communicate within a network. This is accomplished here by implementing remote procedure calls (RPC) that make use of a stub concept.

Five software parts are involved in a remote call here: The user, the user stub, the RPC communication packet, the server stub and the server. The user, the user stub and part of the communication packet is executed on the calling machine; the server, the server stub and another part of the communication packet are executed on the called machine. If the user wishes to perform a remote call, then this is done in the same way as a normal call, except that in this case it calls up a corresponding procedure in the user stub. This user stub is responsible for determining a target procedure for the call and packing the arguments in one or more packets, and sending the latter securely to the called machine. The information is then unpacked by the server stub at this called machine and said stub calls up a corresponding procedure in the server in a perfectly normal call. Once this call has been processed in the server, the server stub returns the results to the suspended process in the calling machine. The results are unpacked there and the user stub returns them to the user. The communication packet is responsible here for the return transmission, the confirmations, the packet routing and the encryption.

A communication process is presented in this publication which relieves the programmer of the workload of programming detailed communication-specific software code. However, compiling and link-editing the code is still required after specifying the system environment. The problem of distributing objects of an object-oriented application in conjunction with a variable system environment is not addressed therein.

SUMMARY OF THE INVENTION

The object of the invention is to state a process for adapting an object-oriented application which can be distributed over a plurality of operating system processes, in particular so that the programmer does not need to modify the sources of the application to be compiled himself.

This object is achieved in a process for adapting an object-oriented application which can be distributed over a plurality of operating system processes a) with a preparation process for code substitution of sources of the application to be compiled in accordance with a stub concept, b) with a configuration process for distributing instances of the application as objects or stub objects for modules to be linked from compiled sources of the application, c) with a communication process provided during execution for calling up methods for objects of the application with the aid of a stub method.

A preferred process with at least one of the following process steps of the preparation process can be executed:

d) a class declaration of the sources is analyzed for allocating method identifications so that methods of used classes of the application can be clearly identified by means of the method identification, e) the classes of the application are extended with a generic method, by means of which the particular method identified by a parameter of the generic method in the form of the method identification can be called up locally during execution, f) base classes of the application are extended by a redefinably declared stub method, g) each of the calls of a method for an object of the classes provided during execution is replaced by a call of the stub method for the object provided during execution, so that in the case of a positive result of the call of the stub method for the object during execution, a call is provided for trans-process sending of a message, by means of which the call of the method of the object is initiated in a remote process, in that the message contains the method identification, and also that the method of the object is called up in the case of a negative result of the call of the stub method for the object during execution in the local process, h) auxiliary definitions for methods are generated so that there are defined for each method of the application at least its class name,
its method name,
its parameter types,
its parameter string for packing and unpacking parameters, and also
its method identification.

A further preferred process with at least one of the following process steps of the configuration process can be executed:

k) a particular system configuration of the application is analyzed for distributing the objects as the instances of the application over the operating system processes of the application, m) a generic instantiation function is generated by means of which a new object of the application can be instantiated during execution, with a local instantiation in the local process in the case of an object to be instantiated locally in accordance with the system configuration, so that the negative result is provided for said locally instantiated object when the stub method is called up in the local process, and also with a remote instantiation in the case of an object to be instantiated remotely in accordance with the system configuration, in that a trans-process trigger is provided in the local process for instantiating said object to be instantiated remotely in the remote process, and also with a local instantiation for a local stub object provided for this object, the stub method of which is redefined in the local process, so that when the stub method is called up the positive result is provided in the local process for this object locally instantiated as stub object, n) a generic delete function is generated, by means of which the instantiation can be deleted by one of the objects of the application during execution, with a local deletion in the local process for a locally instantiated object in accordance with the system configuration, and also with a remote deletion for a remotely instantiated object in accordance with the system configuration, in that a trans-process trigger is provided in the local process for deleting said remotely instantiated object in the remote process, as well as a local deletion of the local stub object provided for said object, p) runfiles are generated, in that modules
for the instantiation function,
for the delete function, and also
for the auxiliary definitions for the methods of the application are linked to the modules for each loadable unit.

A further preferred process with at least one of the following process steps of the communication process can be executed:

r) the stub method for one of the objects is called up locally, and also a local method call for the object is made in the case of a negative result, s) in the case of a positive result for the local call of the stub method for the object
the method identification,
the remotely instantiated object, and also
method parameters are determined from the linked auxiliary definitions, t) a message is packed in the local process on the basis of the parameter string, u) the message is received in the remote process, v) the locally instantiated object is determined in the remote process after unpacking the parameters, w) the call of the method thereby identified is executed by means of the generic method on the basis of the method identification.

The invention is based on the idea that the sources of the application to be compiled can be modified in a preparation process, preferably by means of a preprocessor, so that by means of code substitution method calls can be replaced by code sequences, by means of which it is possible to decide during execution whether trans-process sending of a message is required, or whether a local call is to be made. This can be realized in that auxiliary definitions are generated for the methods, so that protection of the consistency of the system for the application is ensured by using these special files. This can be further achieved in that a stub concept is applied in which stub methods and stub objects are used. This can furthermore be achieved in that an instantiation function and also a delete function are inserted into a runtime system. This can furthermore be achieved in that in particular a generic method is used for a trans-process communication process during execution, by means of which the method call identified thereby can be executed on the basis of a method identification.

Advantageously, the programmer need not modify the sources himself.

The programmer can advantageously create the sources of the application using the language facilities of the programming language C++ for example.

In an advantageous manner, modification of the sources together with their subsequent compilation only once is sufficient during the preparation process as a result of the code substitution. If the system configuration changes, that is to say if the distribution of the application over a plurality of operating system processes changes, it is not necessary to change the sources of the application, so that new compilation is not required either.

In an advantageous manner, the consistency of the overall system of the object-oriented application is ensured for a particular system configuration by means of the auxiliary definitions.

The invention will be explained in greater detail with reference to the figures which contain exemplary embodiments.

DETAILED DESCRIPTION OF THE PREFERRED EMBODIMENTS

Figure 1:
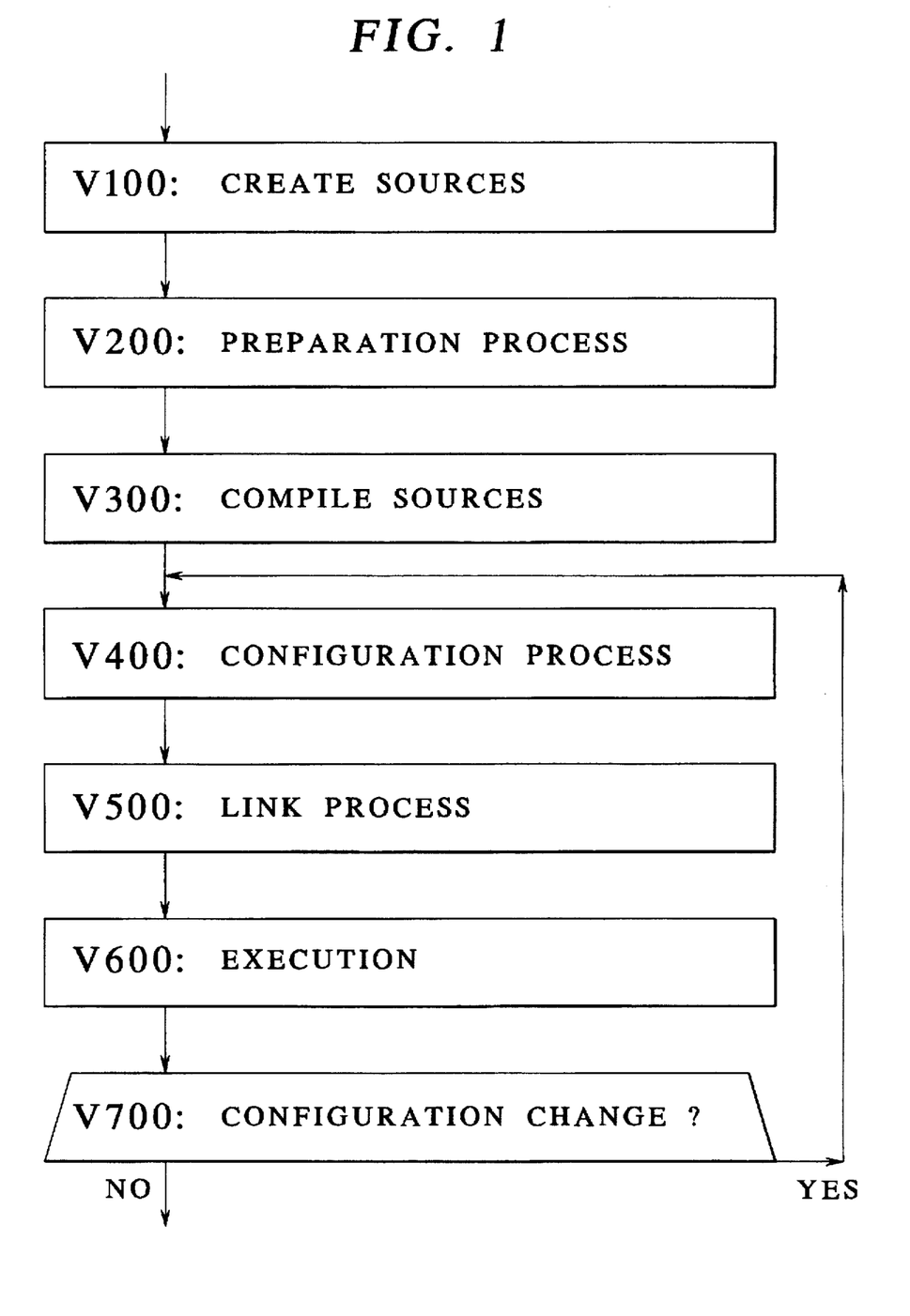
FIG. 1 shows a process according to the invention for adapting an object-oriented application which can be distributed over a plurality of operating system processes.

As FIG. 1 shows, an exemplary embodiment of the process according to the invention for adapting an object-oriented application which can be distributed over a plurality of operating system processes comprises the process steps V100, V200, V300, V400, V500, V600 and V700.

process step V100 is executed. The sources of the application to be compiled are created by the programmer.

process step V200 is executed. A preparation process is performed for the created sources of the application to be compiled. A preprocessor can be provided here to perform the preparation process. Class declarations of the sources of the application are analyzed. Method identifications are prepared. The classes of the applications are extended by the generic method. The method calls in the sources of the application are modified, in that code sequences are inserted instead of the method calls by means of code substitution. Auxiliary definitions are generated for the methods of the application.

process step V300 is executed. The sources modified by the preparation process are compiled.

This is followed by process step V400. A configuration process is executed. A configuration file is analyzed. An instantiation function is generated. A delete function is generated. Auxiliary definitions for the methods of the application are co-linked. Runfiles are generated.

This is followed by process step V500. A link process is executed. Executable phases of the operating system processes are linked.

This is followed by process step V600. One run of the operating system processes of the application is executed.

This is followed by process step V700. It is examined whether it is necessary to change the configuration. If this is the case, process step V400 follows. The configuration process is performed again in accordance with the changed system configuration. This is followed by process step V500 in which the link process is performed again. This is followed by process step V600 in which the application is executed in accordance with the changed system configuration.

Figure 2:
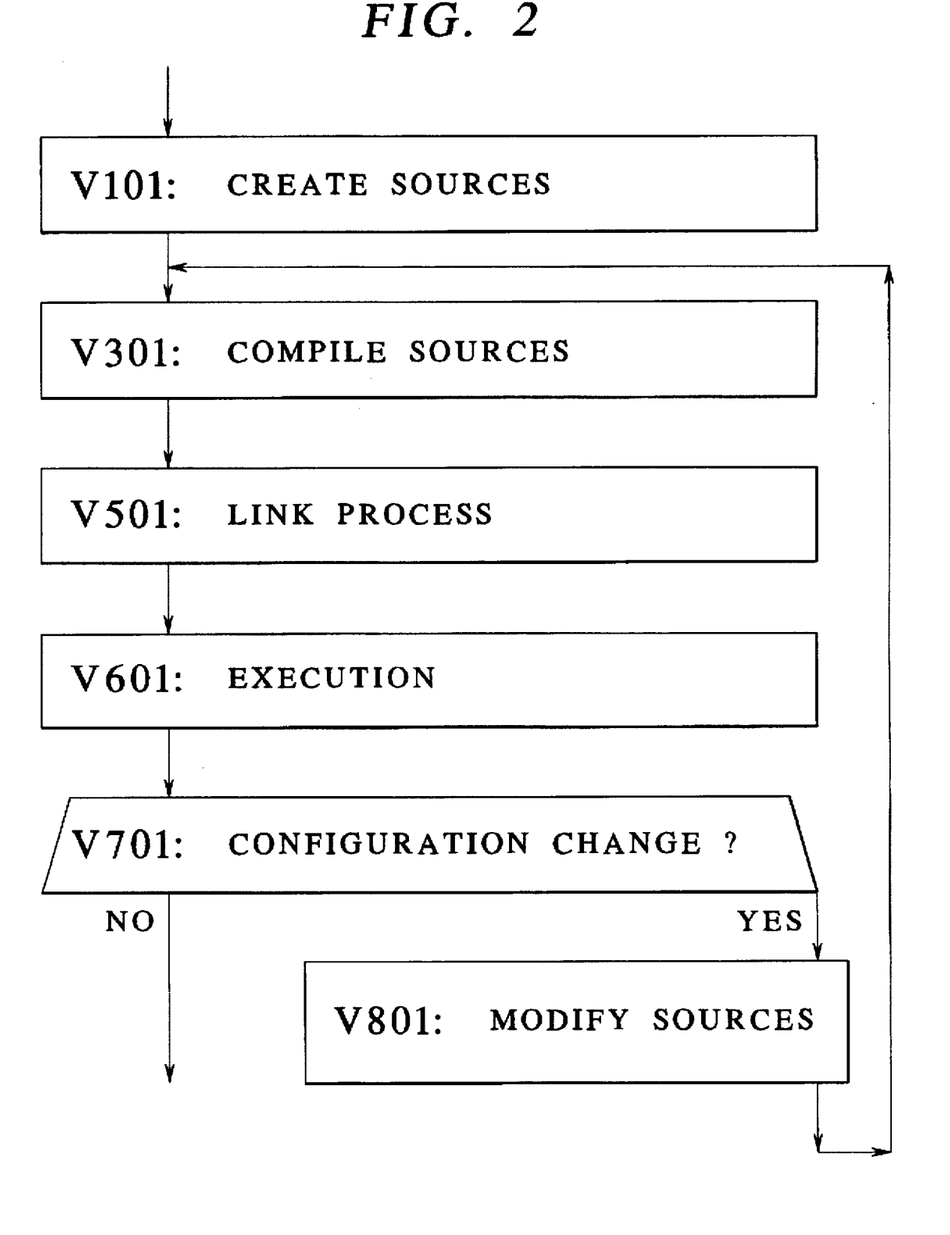
FIG. 2 show another process for adapting an object-oriented application which can be distributed over a plurality of opting system processes.

As FIG. 2 shows, an exemplary embodiment of another process for adapting an object-oriented application comprises the process steps V101, V301, V501, V601, V701 and V801.

process step V101 is executed. The sources of the application are created by a programmer. Depending on the distribution of the application over a plurality of operating system processes, the programmer explicitly enters the calls for trans-process communication into the sources of the application.

This is followed by process step V301. The created by the programmer are compiled.

This is followed by process step V501. The link process is executed for the compiled sources of the application.

This is followed by process step V601. The application is executed.

This is followed by process step V701. It is checked whether it is necessary to change the configuration. If this is the case, process step V801 follows. The sources of the application are modified by the programmer in accordance with a new system configuration, in that calls for trans-process communication are explicitly inserted into the sources in accordance with the new distribution of the application over individual operating system processes. This is followed by process step V301 again, in which the sources that have just been modified are compiled.

This is followed by process step V501 in which the link process is performed again.

This is followed by process step V601 in which the application is executed in accordance with the new system configuration.

Figure 3:
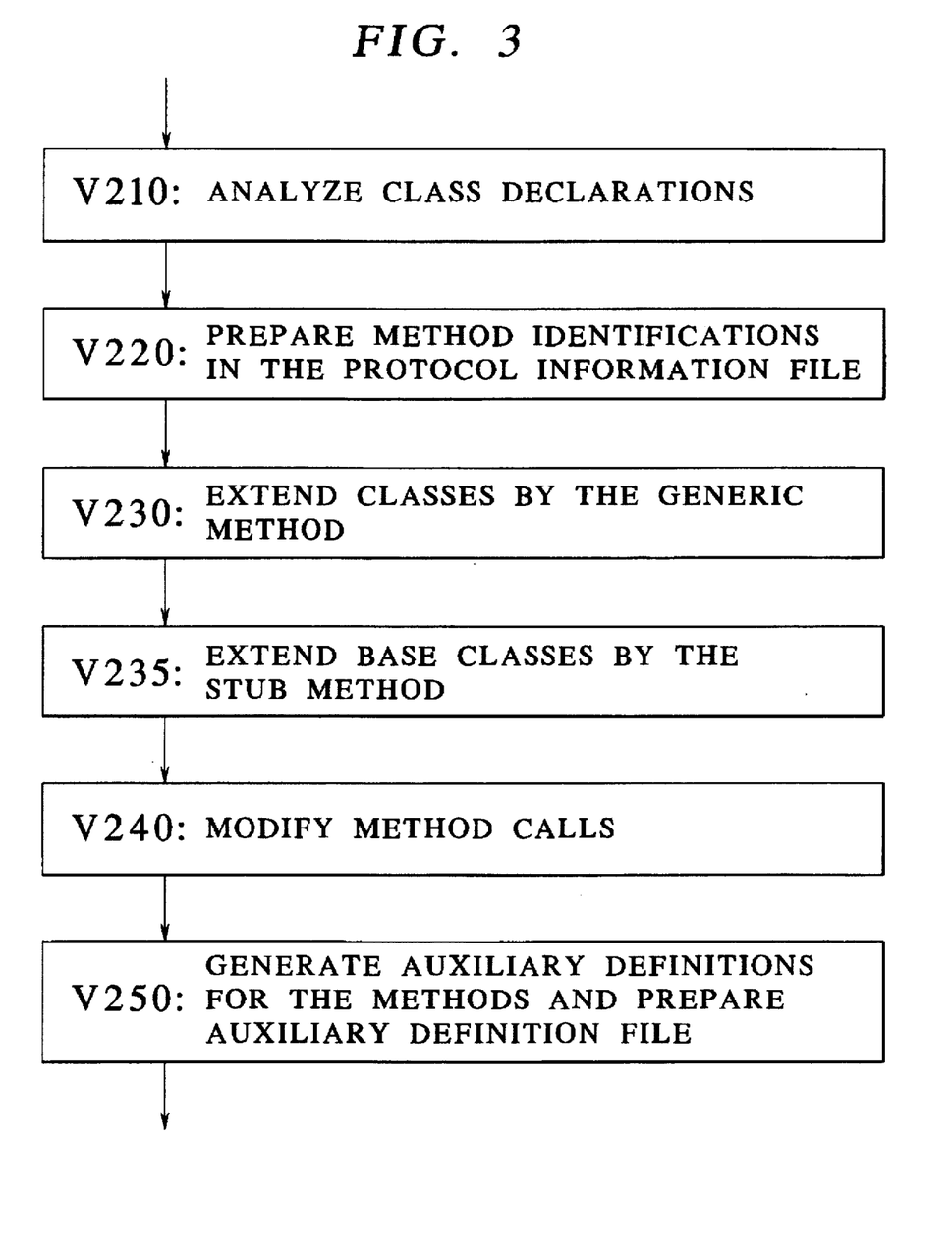
FIG. 3 shows a preparation process for the process according to the invention for adapting an object-oriented application which can be distributed over a plurality of operating system processes.

As FIG. 3 shows, an exemplary embodiment of the preparation process of the process step V200 comprises the process steps V210, V220, V230, V235, V240 and V250.

process step V210 is executed. A class declaration of the sources of the application is analyzed for allocating method identifications so that the methods of the classes of the application used can be clearly identified across the whole system by means of the method identification.

This is followed by process step V220. A protocol information file is prepared which contains auxiliary definitions for the methods of the application, so that for each method of the application at least its class name, its method name, its parameter types, its parameter string for packing and unpacking parameters and also its method identification are defined.

This is followed by process step V230. The classes of the application are extended by the generic method. On the basis of the method identification it is possible to execute a call of the method identified thereby by means of the generic method.

This is followed by process step V235. The base classes of the application are extended by a redefinably declared stub method.

This is followed by process step V240. The method calls in the sources are modified by means of code substitution.

This is followed by process step V250. The auxiliary definitions for the methods are generated and prepared in an auxiliary definition file.

Figure 4:
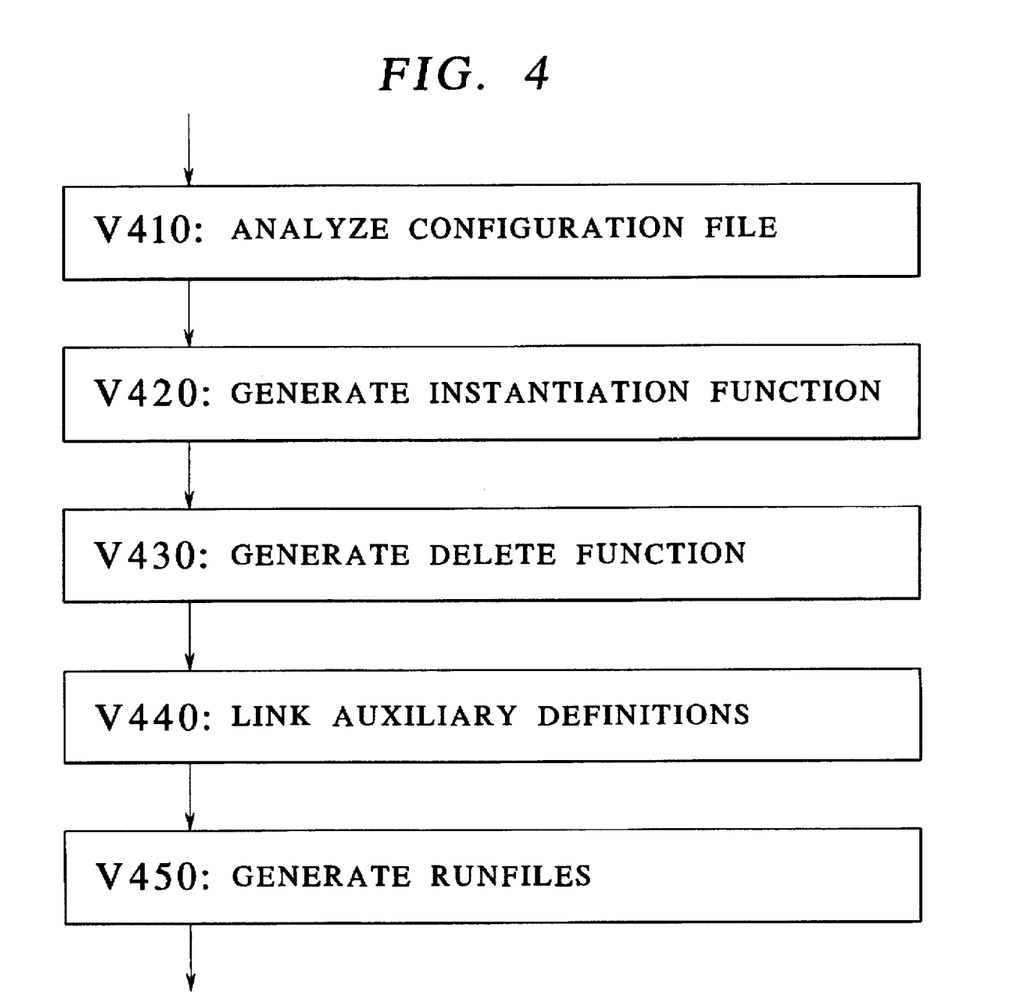
FIG. 4 shows a configuration process for the process according to the invention for adapting an object-oriented application which can be distributed over a plurality of operating system processes.

As FIG. 4 shows, an exemplary embodiment of the configuration process of the process step V400 comprises the process steps V410, V420, V430, V440 and V450.

process step V410 is executed. A particular system configuration of the application is analyzed on the basis of a configuration file, by means of which a distribution of the objects of the application over the operating system processes of the application is performed.

This is followed by process step V420. A generic instantiation function is generated, by means of which the objects of the application can be instantiated during execution.

This is followed by process step V430. A generic delete function is generated, by means of which the instantiation of the objects of the application can be deleted during execution.

This is followed by process step V440. Modules for the auxiliary definitions for the methods of the application are linked.

This is followed by process step V450. Runfiles are generated, in that modules for the instantiation function, for the delete function and also for the auxiliary definitions for the methods of the application are linked to the modules for each loadable unit.

Figure 5:
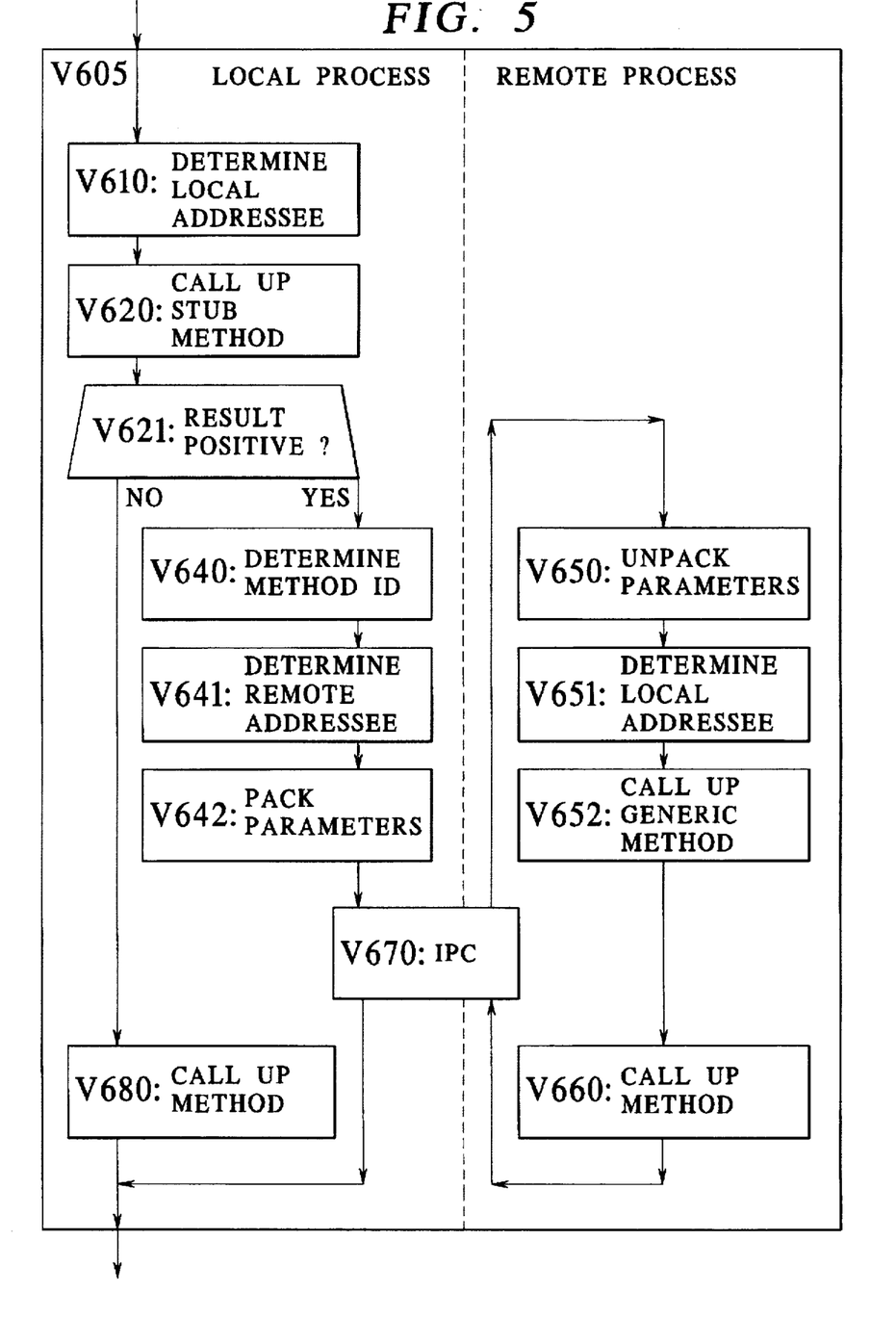
FIG. 5 shows a trans-process communication process for the process according to the invention for adapting an object-oriented application which can be distributed over a plurality of operating system processes.

As FIG. 5 shows, as part of the process step V600, an exemplary embodiment of a process step V605 comprises the process steps V610 to V680 for a pass for calling up a method for an object of the application.

The process step V610 is executed in a local process. A local addressee is determined. In the case of a local object, the latter is the instance itself. In the case of a remote object, the local addressee is the associated stub object.

This is followed by process step V620. The stub method is called up for the local addressee.

This is followed by process step V621. It is checked whether the result of calling up the stub method for the local addressee is positive.

If the result is negative, process step V680 follows and the method for the local addressee is called up, which in this case is the instantiated local object.

process step V640 follows if the result is positive. The method identification of the method to be called up is determined.

This is followed by process step V641. The remote addressee is determined, which in this case is the remotely instantiated object.

This is followed by process step V642. The parameters for the remote call of the method are packed.

This is followed by process step V670. Inter-process communication (IPC) takes place between the local process and the remote process.

process step V650 follows in the remote process. The parameters for calling up the method are unpacked.

This is followed by process step V651. The local addressee in the remote process is determined. In this case this is the object instantiated in the remote process.

This is followed by process step V652. The generic method in which the method to be called up is determined by means of the method identification is called up.

This is followed by process step V660. The method for the object instantiated in the remote process is called up.

The local process is resumed after the remote process by means of the inter-process communication of process step V670.

Figure 6:
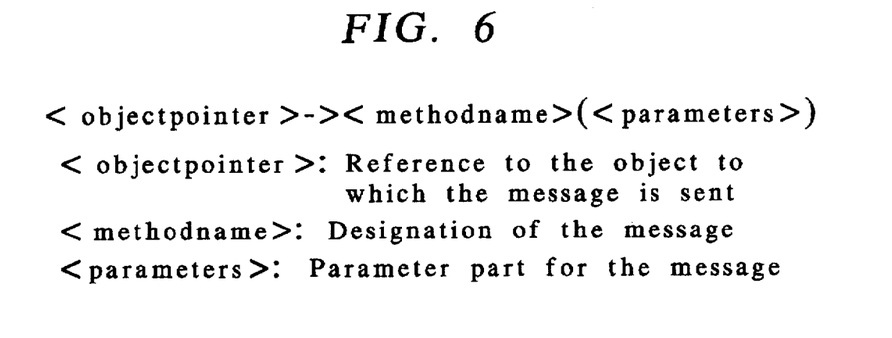
FIG. 6 shows a method call.

As FIG. 6 shows, an exemplary embodiment of a local call of a method for an object comprises an object pointer, a method name, and parameters. The object pointer forms here a reference to the object to which a message is sent. The method name forms here a designation for the message. The parameters form here a parameter part for the message.

In accordance with accepted notation, the following notation applies for example:
<objectpointer>→<methodname>(<parameters>)
<objectpointer>: Reference to the object to which the message is sent
<methodname>: Designation of the message
<parameters>: parameter part for the message.

For example, in the programming language C++, its communication mechanism is designed in such a way that only the addressing of objects within one operating system process is supported. Applications that are to be distributed over a plurality of independent operating system processes therefore require an extended communication mechanism. This extension of the communication mechanism should not be accomplished by extending the programming language, since this restricts portability. This communication mechanism should be extended in such a way that portability is ensured. In addition to the local process communication mechanism anchored in the programming language, a mechanism for trans-process message exchange should also be made available in the form of inter-process communication (IPC). No new language facilities should be required here, so that no compiler extension is necessary. In a preparation process for the sources of the application to be compiled, such a method call should be replaced by means of code substitution by a preprocessor by a code sequence which contains additional implicit calls for the trans-process message exchange (IPC). Both the local process message exchange and an extended message exchange across process boundaries is to be permitted by means of said code sequence.

Figure 7:
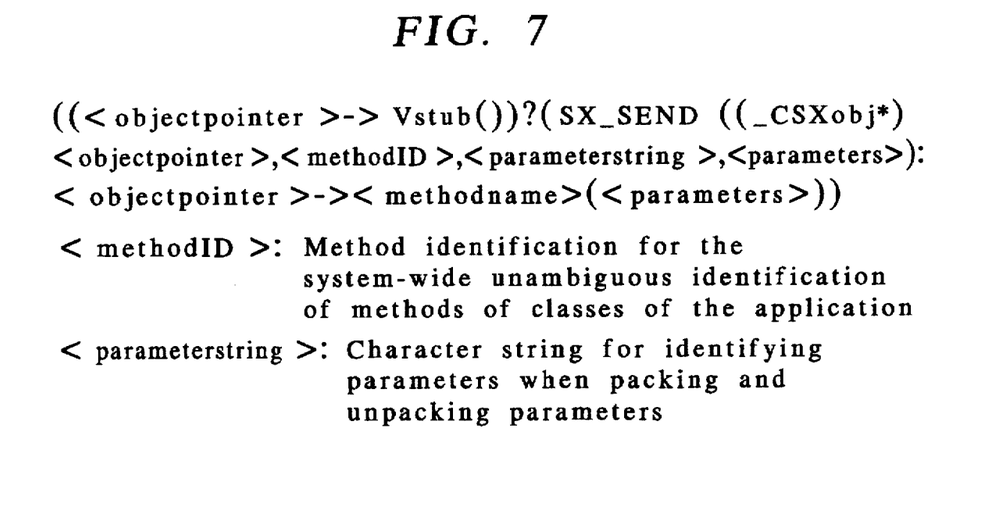
FIG. 7 shows a code sequence after code substitution of the method call.

As FIG. 7 shows, an exemplary embodiment of such a code sequence comprises a local call of a stub method Vstub, so that in the case of a positive result for this call, an extended form of the call is provided for inter-process communication (IPC), and also that in the case of a negative result a local method call is provided which is the same as the method call illustrated in FIG. 6, which is replaced by the code sequence illustrated in FIG. 7 during the code substitution.

In accordance with accepted notation, the following notation applies for example:
((<objectpointer>→Vstub())?(SX_SEND((_CSXobj*)
<objectpointer>,<methodID>,<parameterstring>, <parameters>):
<objectpointer>→<methodname>(<parameters>))
<methodID>: Method identification for the system-wide unambiguous identification of methods of classes of the application
<parameterstring>: Character string for identifying parameters when packing and unpacking parameters.

The method identification serves here for the system-wide unambiguous identification of methods for classes of the application. A parameter string is provided which serves in the form of a character string to identify parameters when packing and unpacking parameters.

Figure 8:
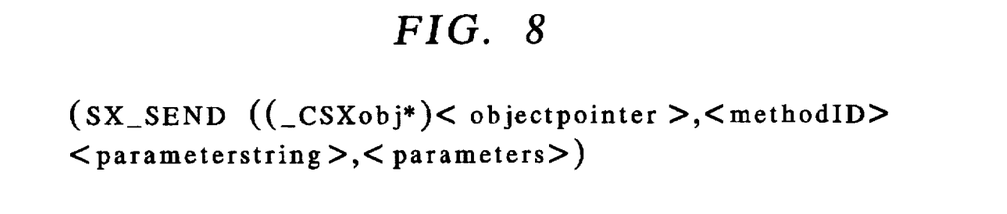
FIG. 8 shows a trans-process send call for a message as part of the code sequence.

As FIG. 8 shows, an exemplary embodiment of such an extended form of the call for inter-process communication (IPC) contains a call for trans-process sending of the message, an object pointer, a method identification, a parameter string and parameters.

In accordance with accepted notation, the following notation applies for example:
SX_SEND((_CSXobj,*)<objectpointer>,<methodID>, <parameterstring>,<parameters>)

Whether this call is actually activated is decided at runtime by evaluating the result determined as an inquiry using the call of the stub method.

Figure 9:
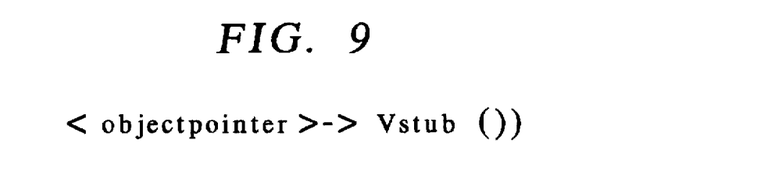
FIG. 9 shows a call of a stub method as a part of the code sequence.

As FIG. 9 shows, an exemplary embodiment of a call of the stub method comprises an object pointer and also the method name Vstub.

In accordance with accepted notation, the following notation applies for example:
(<objectpointer>→Vstub())

Before sending the message according to the method name to the object referenced, it is determined in each case whether a local process method call is to be performed, or whether a call extended by means of inter-process communication (IPC) is to be performed. In the case of an IPC call, the function SX_SEND is used, and this must be provided with the appropriate parameters. This provision of parameters should be performed automatically by the preprocessor during the code substitution.

The code substitution is advantageously carried out according to simple rules so that it can be automated and can be performed by a tool for example.

Together with the code substitution for the message calls, it is also necessary to substitute the parts of code relating to the instantiation of classes and the removal of objects from the system.

The decision as to which form of the communication mechanism is used in each case, that is to say sending of the message locally in the process or trans-process sending of the message, should be made at program runtime, to be precise depending on a current system constellation, which is dynamically variable in object-oriented software systems. In order to ensure high performance, this inquiry should be carried out very quickly and therefore locally in the process. An instance should exist in each case in every operating system process which can provide information as to whether an addressed object is currently located in the respective operating system process of the message sender, or, if it exists in another operating system process, provide route information to enable addressing. This should be handled by means of a stub concept.

In such a stub concept, representative objects should be present as stub objects instead of the real objects in a distributed application in operating system processes which do not themselves contain a real object. Said stub objects are then available locally as a contact point in the event of a request to the real object and can either directly assume the tasks thereof or forward the required service to the real object. Said stub objects should behave towards the other objects in exactly the same way as real objects.

Such a task or possible service is, for example, the information as to whether a particular object is the instance itself or the stub object. If it is the instance itself, the message can be sent directly to the addressed object in the customary form for the programming language C++ for example. Otherwise, the stub object should make available all the necessary information about it in order to forward the relevant request to the real object. If each object, including the stub objects, can provide information as to whether it itself is a stub object or not. A method, the stub method Vstub(), is made available as a virtual method in the base class of all application classes for this purpose. As a result of the inheritance mechanism, all objects of the application automatically receive the capability of providing information as to whether they are stub objects or real objects. The stub method which supplies a negative result in the event of an activation is made available in the base class of all application classes. The stub method must be declared in a redefinable manner, in that the stub method contains the keyword virtual in the programming language C++ for example. For stub classes, the stub method is redefined so that it supplies a positive result. Accordingly, in response to the inquiry Vstub(), in accordance with the stub method stub objects supply a different result than the non-stub objects, for which a default implementation is used.

A system configuration, that is to say a distribution of the objects over operating system processes, need only be defined after the translation of the source programs. It should only be decided at runtime which communication mechanism is used in each case. This also applies to the procedure of instantiation of classes as well as the removal of objects from the running system. This cannot be performed statically by the compiler, but rather should be executed by the runtime system.

Just as with the code substitution for the message calls, the calls NEW and DELETE are also replaced in the source by the preprocessor by the functions SX_NEWobj as instantiation function and SX_DELETE as delete function. These functions are executed in the runtime system. These functions are linked to each loadable unit. They incorporate information about whether an object is to be instantiated locally or remotely or is to be deleted. Accordingly, during the instantiation either the operator NEW is used in the programming language C++ for example, or the instantiation of the object in another operating system process is initiated via inter-process communication and in this case only a stub object is generated locally. The delete function decides at runtime whether the object to which it is applied is a stub object or a real object. Depending on this, either the operator DELETE is used in the programming language C++ for example, or the deletion of an object in another operating system process is initiated via inter-process communication and the stub object is deleted locally. The implementation of the instantiation function and the delete function is generated on the basis of specifications in a configuration file.

In the case of the trans-process communication mechanism, method calls, that is to say also calls of constructors and destructors, go beyond process boundaries, so that these calls must be converted into data that can be sent. The methods of the classes used are identified here by method identifications. Said method identifications are allocated unambiguously across the whole system by means of a protocol information file for example and are evaluated by means of the generic method which each object possesses. The protocol information file forms a system-wide database of methods and their method identifications. This is evaluated during each code substitution and supplemented where necessary. The protocol information file contains the following data for each method of the application:

class name method name types of the parameters of the method (this information is necessary since, in the programming language C++ for example, methods cannot be clearly identified solely on the basis of class names and method names, but only by the parameter types)

parameter string (used for packing and unpacking the parameters for example)

method identification.

During the code substitution, the definition of each class used is extended by the generic method. The latter maps the method identifications onto local method calls. Each method call from another process initially leads in the receiving process to a call of the generic method with the method identification as parameter.

In the case of trans-process sending of the message, the parameters of the method call are packed and sent in a data structure. The functions SX-SEND and the generic method are provided for the packing and unpacking of the parameters. For this, information about method parameters is transferred encoded to the function SX-SEND, for example in the form of a string. This information string, that is to say the parameter string, is likewise prepared by the preprocessor during the code substitution.

In this way in an object-oriented application a preparation process is used when compiling the application, a configuration process is used when link-editing, and a communication process is used during execution to call up methods for objects. No adaptation of sources is necessary when a system configuration is changed. This also applies to an extension of the object-oriented application.

Although other modifications and changes may be suggested by those skilled in the art, it is the intention of the inventors to embody within the patent warranted hereon all changes and modifications as reasonably and properly come within the scope of their contribution to the art.

We claim:

1. A computer driven process for distributing an object-oriented application, which is written in a programming language whose communication mechanism is designed in such a way that only the addressing of objects within one computer-operating system is supported, over operating system processes that can be loaded and executed locally and remotely, the process comprising the steps of:

a) initiating a preparation process in which, for sources of the application to be compiled, at least one method call is replaced by a code sequence by: substitution code by a preprocessor during compilation in accordance with a stub concept; providing information as to whether an addressed object is currently located in the respective operating system process of the message sender at an instance that exists in every operating system process, or, if it exists in another every operating system process, providing route information to enable addressing, so that representative objects are present as stub objects instead of the real objects in the distributed application in operating system processes which do not themselves contain a real object;

b) distributing instances of the application with a configuration process for modules to be linked from compiled sources of the application as objects or stub objects over the operating system processes in accordance with a system configuration when link-editing the modules; and c) calling up methods for objects of the application with a communication process provided during execution enabling a decision by using a local call of the stub method as to whether trans-process sending of a message is required or whether the call can be handled locally.

2. The computer-driven process of claim 1, with at least one of the following process steps of the preparation process:

d) analyzing a class declaration of the sources for allocating method identifications so that methods of used classes of the application are clearly identifiable by means of the method identification;

e) extending the classes of the application with a generic method by means of which the particular method identified by a parameter of the generic method in the form of the method identification can be called up locally during execution;

f) extending base classes of the application by a redefinably declared stub method;

g) replacing each of the calls of a method for an object of the classes provided during execution by a call of the stub method for the object provided during execution, so that if a positive result of the call of the stub method for the object during execution, a call is provided for trans-process sending of a message, by means of which the call of the method of the object is initiated in a remote process, in that the message contains the method identification, and also that the method of the object is called up if a negative result of the call of the stub method for the object during execution in the local process;

h) generating auxiliary definitions for methods so for each method of the application at least its class name, its method name, its parameter types, its parameter string for packing and unpacking parameters, and also its method identification are defined.

3. The computer driven process of claim 2 with at least one of the following process steps of the configuration process:

k) analyzing a particular system configuration of the application for distributing the objects as the instances of the application over the operating system processes of the application;

m) generating a generic instantiation function by means of which a new object of the application can be instantiated during execution,
   with a local instantiation in the local process in the case of an object to be instantiated locally in accordance with the system configuration, so that the negative result is provided for said locally instantiated object when the stub method is called up in the local process,
   and also with a remote instantiation in the case of an object to be instantiated remotely in accordance with the system configuration, in that a trans-process trigger is provided in the local process for instantiating said object to be instantiated remotely in the remote process, and also with a local instantiation for a local stub object provided for this object, the stub method of which is redefined in the local process, so that when the stub method is called up, the positive result is provided in the local process for this object locally instantiated as stub object;

n) generating a generic delete function by means of which the instantiation can be deleted by one of the objects of the application during execution,
   with a local deletion in the local process for a locally instantiated object in accordance with the system configuration,
   and also with a remote deletion for a remotely instantiated object in accordance with the system configuration, in that a trans-process trigger is provided in the local process for deleting said remotely instantiated object in the remote process, as well as a local deletion of the local stub object provided for said object; and p) generating run files in that modules for the instantiation function, for the delete function, and also for the auxiliary definitions for the methods of the application are linked to the modules for each loadable unit.

4. The computer driven process of claim 3 with at least one of the following process steps of the communication process:

r) calling up the stub method for one of the objects locally and also making a local method call for the object for a negative result;

s) determining for a positive result for the local call of the stub method for the object the method identification, the remotely instantiated object, and also method parameters from the linked auxiliary definitions;

t) packing a message in the local process based on the parameter string;

u) receiving the message in the remote process, v) determining the locally instantiated object in the remote process after unpacking the parameters and w) executing the call of the method thereby identified by means of the generic method based on the method identification.

* * * * *